(12) United States Patent
Surace et al.

(10) Patent No.: US 10,989,099 B2
(45) Date of Patent: Apr. 27, 2021

(54) DUAL PUMP GROUP WITH MECHANICAL DRIVE COMPRISING A CENTRIFUGAL CLUTCH

(71) Applicant: INDUSTRIE SALERI ITALO S.P.A., Brescia (IT)

(72) Inventors: Alfonso Surace, Brescia (IT); Marco Pedersoli, Brescia (IT)

(73) Assignee: Industrie Saleri Italo S.p.A., Lumezzane (IT)

( * ) Notice: Subject to any disclaimer, the term of this patent is extended or adjusted under 35 U.S.C. 154(b) by 0 days.

(21) Appl. No.: 16/642,654

(22) PCT Filed: Jun. 21, 2018

(86) PCT No.: PCT/IB2018/054574
§ 371 (c)(1),
(2) Date: Feb. 27, 2020

(87) PCT Pub. No.: WO2019/064083
PCT Pub. Date: Apr. 4, 2019

(65) Prior Publication Data
US 2020/0256240 A1    Aug. 13, 2020

(30) Foreign Application Priority Data

Sep. 26, 2017   (IT) .................. 102017000107668

(51) Int. Cl.
*F01P 5/12*      (2006.01)
*F16D 43/18*     (2006.01)
(Continued)

(52) U.S. Cl.
CPC ............... *F01P 5/12* (2013.01); *F16D 43/18* (2013.01); *B60Y 2400/416* (2013.01);
(Continued)

(58) Field of Classification Search
CPC ....... F01P 5/12; F01P 2005/125; F16D 43/18; F16D 2043/145; B60Y 2400/416; F04D 13/06
(Continued)

(56) References Cited

U.S. PATENT DOCUMENTS

| | | |
|---|---|---|
| 1,861,809 A | 6/1932 | McCaleb |
| 2007/0232447 A1* | 10/2007 | Maimone .............. F16D 43/215 477/176 |
| 2016/0252000 A1* | 9/2016 | VanZuilen .......... F04D 15/0066 123/41.02 |

FOREIGN PATENT DOCUMENTS

| | | |
|---|---|---|
| DE | 102011117374 A1 | 5/2013 |
| EP | 1911970 A2 | 4/2008 |
| JP | S60119318 A | 6/1985 |

OTHER PUBLICATIONS

International Search Report and Written Opinion for International Patent Application No. PCT/IB2018/054574, dated Sep. 12, 2018. 11 pages.

* cited by examiner

*Primary Examiner* — Joseph J Dallo
*Assistant Examiner* — Yi-Kai Wang
(74) *Attorney, Agent, or Firm* — Armstrong Teasdale LLP

(57) ABSTRACT

A pump group for a cooling system of an engine of a vehicle, of the dual type is provided. The pump group includes an impeller mounted on a shaft commandable in rotation by an electric drive and a mechanical drive. The mechanical drive includes a rotating member commandable in rotation by mechanical movement devices in the vehicle, a rotary drum operatively connected to the shaft, a centrifugal clutch device including a central body integrally attached to the rotating member and a plurality of engagement elements movably fixed on the central body suitable to translate in a (Continued)

radial direction with respect to the axis (X-X) to engage the rotary drum.

15 Claims, 4 Drawing Sheets

(51) Int. Cl.
*F04D 13/06* (2006.01)
*F16D 43/14* (2006.01)

(52) U.S. Cl.
CPC ........ *F01P 2005/125* (2013.01); *F04D 13/06* (2013.01); *F16D 2043/145* (2013.01)

(58) Field of Classification Search
USPC ....................................................... 123/41.4
See application file for complete search history.

DUAL PUMP GROUP WITH MECHANICAL DRIVE COMPRISING A CENTRIFUGAL CLUTCH

CROSS-REFERENCE TO RELATED APPLICATIONS

This application is a National Phase filing of PCT International Application No. PCT/IB2018/054574, having an International Filing Date of Jun. 21, 2018, which claims the benefit of priority to Italian Patent Application No. 102017000107668, having a filing date of Sep. 26, 2017, each of which is hereby incorporated by reference in its entirety.

FIELD OF THE INVENTION

The present invention relates to a pump group for a cooling system of a vehicle, preferably for cooling an engine, such as internal combustion. In particular, the present invention relates to a pump group having a dual actuation, i.e. comprising both an electric drive and a mechanical drive.

BACKGROUND

As is known, during the normal use of an engine, it is appropriate to vary the intensity of the cooling action. For example, intense cooling is required when the engine is running at full speed or in towing conditions or on an uphill road or at high ambient temperatures. On the contrary, in other conditions of use it is advisable that the cooling is not too strong, for example when the engine is started or when at the end of the use thereof.

Cooling pumps are known in the prior art in which this need has been met by having a dual drive. In other words, cooling pumps are known in which the rotational speed of the impeller comprised therein is regulated by specific command means comprising both an electric drive and a mechanical drive.

In such cooling pumps, the rotational speed of the impeller is commanded in rotation according to the needs, or by the mechanical drive, typically operatively connected to the vehicle engine and therefore a function of the engine rpm, or by the electric drive, typically comprising an electric motor.

Unfortunately, these pumps have a particularly complex management of the two drives.

In particular, in fact, the technical drawback that the mechanical drive starts its rotary action by giving a tearing. This sudden action urges not only the components of the mechanical drive, but also the other components of the pump group and in particular the components of the same kinematic chain, including those comprised in the electric drive.

SUMMARY

The object of the present invention is to provide a pump group for a cooling system of a vehicle, for example for an internal combustion engine, of the dual drive type, which has a simple management of the two drives, specifically addressing the aforesaid problem.

In other words, the object of the present invention is to have a dual pump group which, upon activation of the mechanical drive, does not perform a sudden action which urges the components of the kinematic actuation chain of the impeller.

This object is achieved by a pump group having the features described below. Preferred embodiment variants having further advantageous aspects are also described.

BRIEF DESCRIPTION OF THE DRAWINGS

The object of the present invention is described in detail hereafter, with the aid of the accompanying drawings, in which.

DETAILED DESCRIPTION

Figure 1:
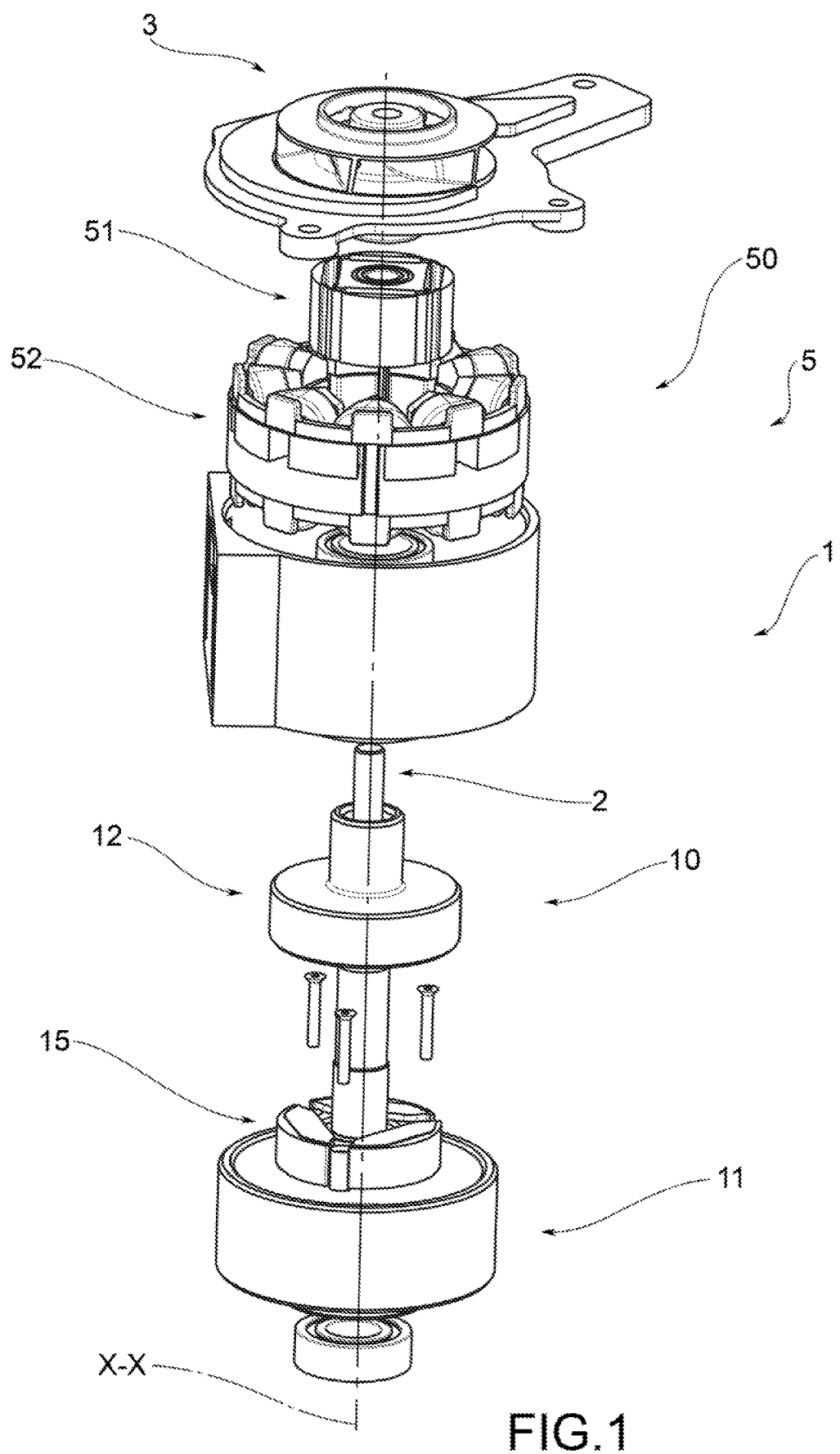
FIG. 1 shows a perspective view with separate parts of the pump group object of the present invention, according to a possible first embodiment.
Figure 2:
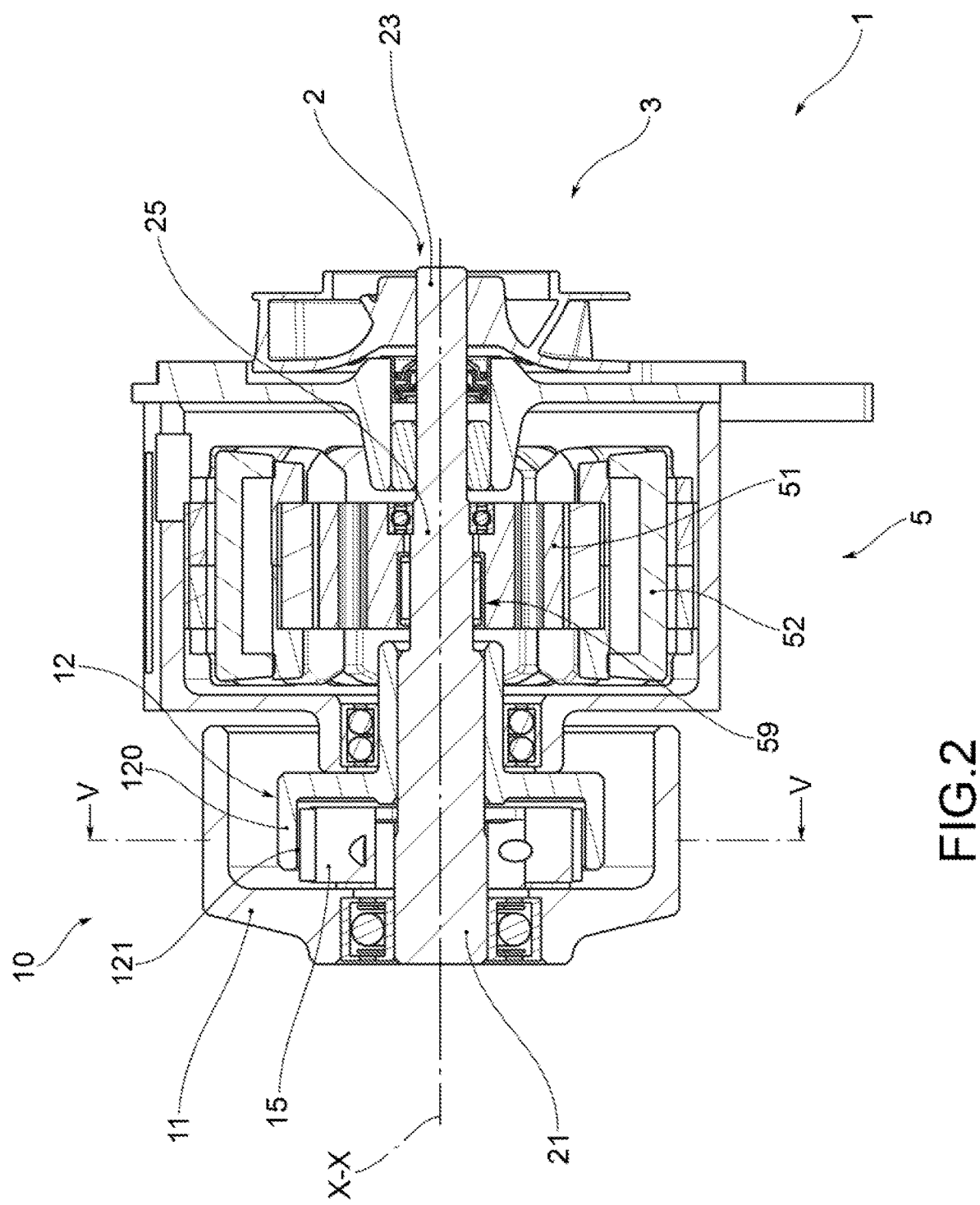
FIG. 2 shows a longitudinal sectional view of the pump group in FIG. 1.
Figure 3:
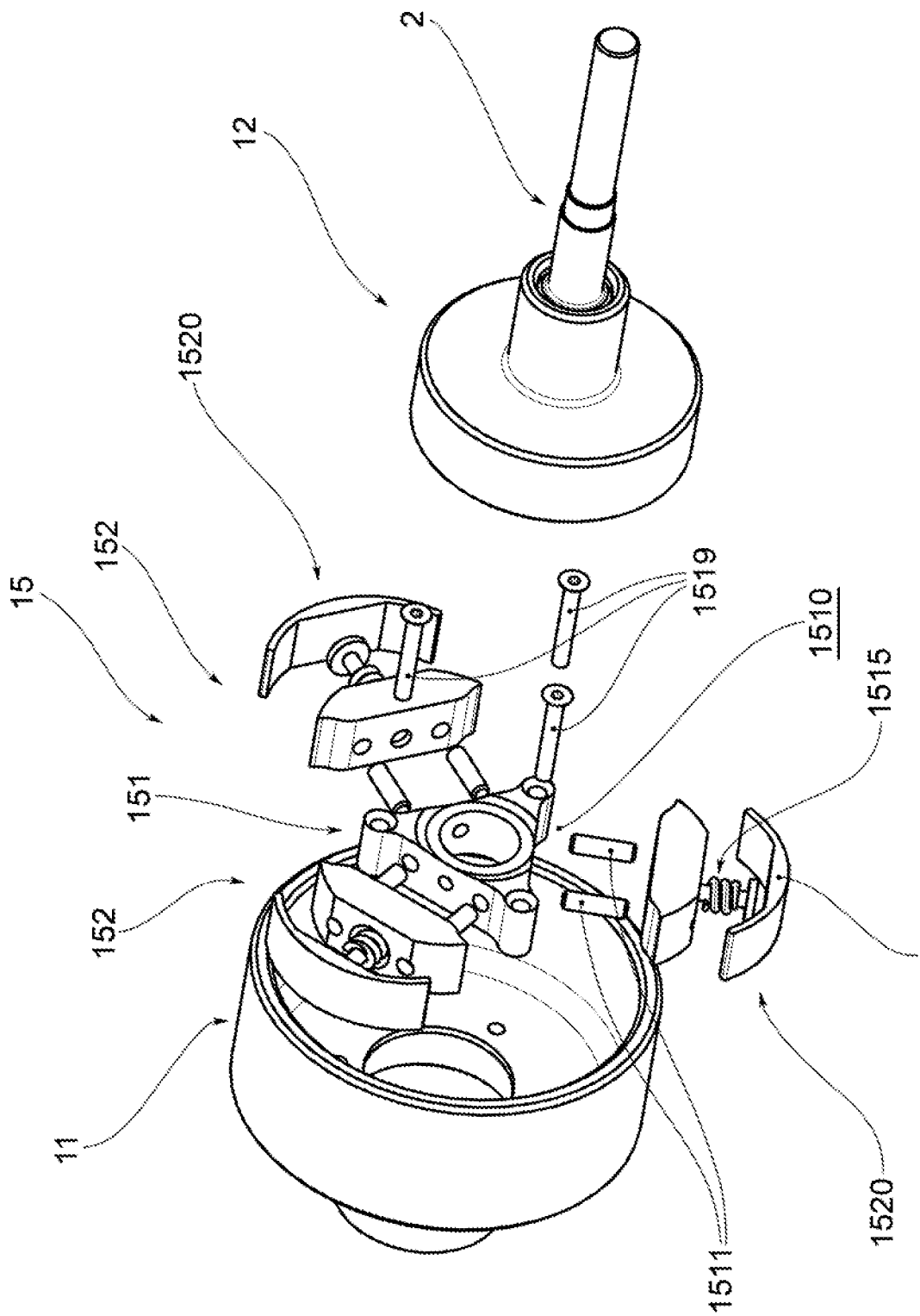
FIG. 3 shows a perspective view with separate parts of a mechanical drive comprised in the pump group in FIG. 1.
Figure 4B:
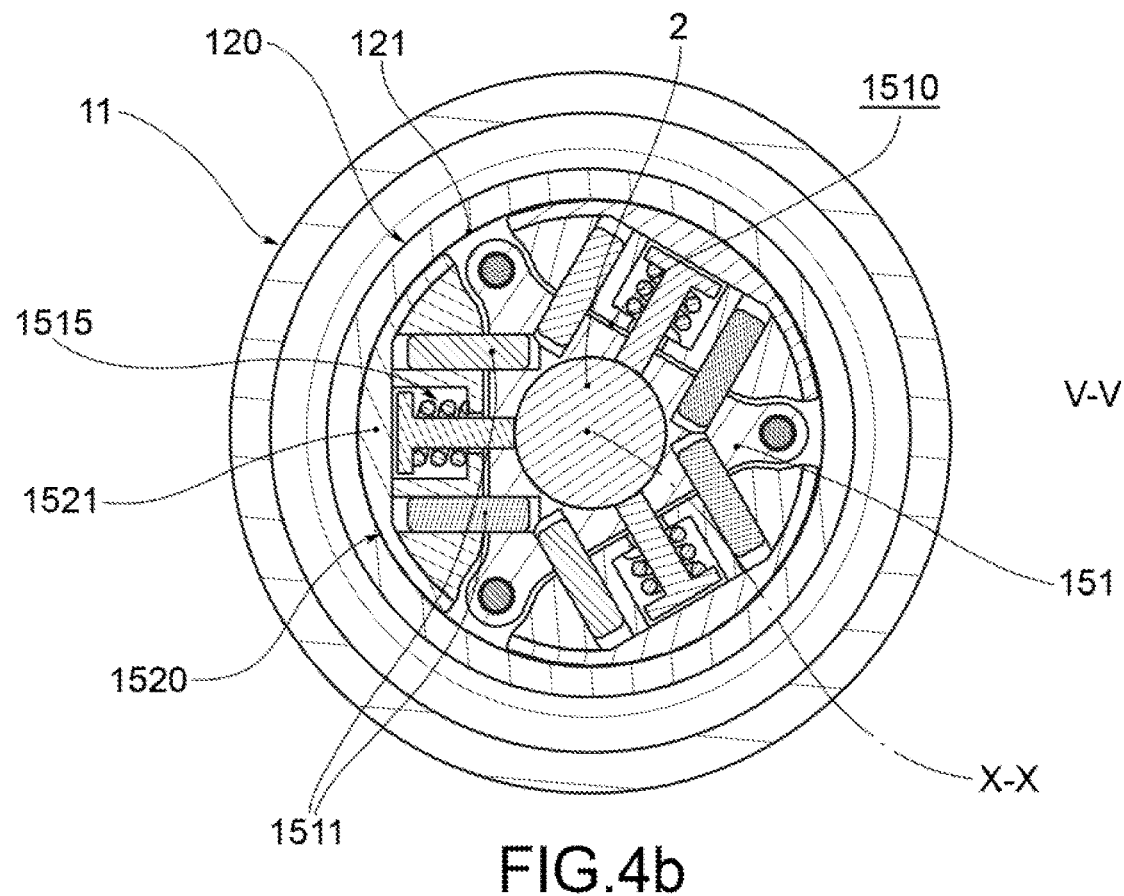
FIGS. 4a and 4b show two sectional views of the mechanical drive along plane V-V in FIG. 2, respectively, in which the engagement elements comprised therein are arranged in a rest configuration and in an engagement configuration.
Figure 4A:
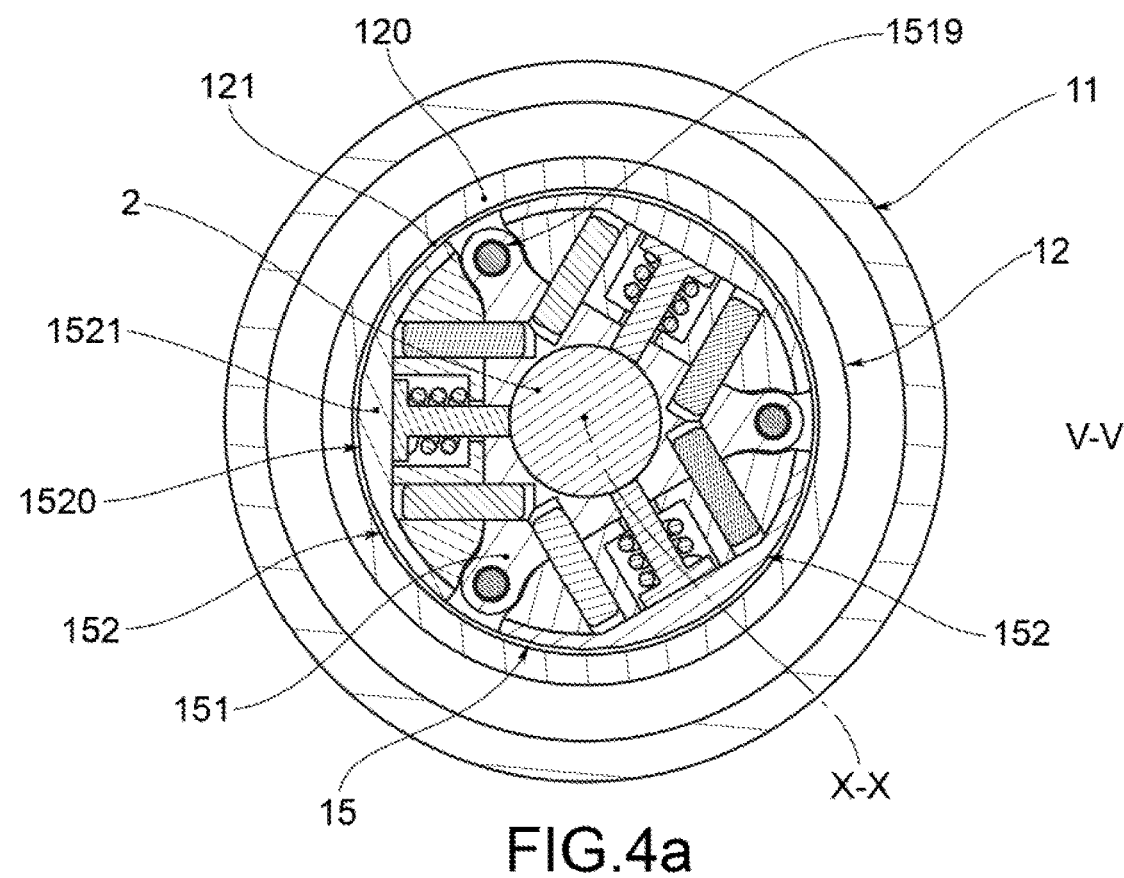

With reference to the above tables, reference numeral 1 denotes, as a whole, a pump group for a cooling system of an engine, preferably internal combustion. Said pump group 1 is of the dual or hybrid type comprising, as described below, specific command means comprising an electric drive 5 and a mechanical drive 10.

The pump group 1 object of the present invention comprises an impeller 3 rotatable about an axis X-X in such a way that a rotation of the impeller 3 corresponds to the movement of a predetermined quantity of coolant in the circuit.

Preferably, the impeller 3 is of the radial type, that is, it provides that the flow of cooling liquid at cooling the inlet has a substantially axial overall direction and the flow of liquid at the outlet has a radial direction.

According to the present invention, the pump group 1 also comprises a shaft 2 which extends in length along said axis X-X. The impeller 3 is operatively connected to said shaft 2, such that a rotation of the shaft 2 corresponds to a rotation of the impeller 3. Preferably, the impeller 3 is integrally connected to the shaft 2 preferably at a rotating end 23 thereof.

The pump group 1 object of the present invention also comprises command means operatively connected to said shaft 2 to command it in rotation as required. In particular, said command means comprise an electric drive 5 and a mechanical drive 10, both respectively adapted to command the movement of the shaft 2 in rotation.

The electric drive 5 preferably comprises an electric motor 5 comprising a rotor 51 and a stator 52, both of which have an axial extension along said axis X-X. Said rotor 51 is operatively connected with the shaft 2 in such a way that when it is moved in rotation by the electric excitation of the stator 52, it transmits the rotary action to the shaft 2 and then to the impeller 3.

Preferably, the shaft 2 has an electric command zone 25 on which the rotor 51 operates.

According to a preferred embodiment, the electric drive 5 and in particular the rotor 51 thereof is integrally connected with the shaft 2 in said electric command zone 25.

According to a preferred embodiment, the electric drive 5 also comprises an "electrical" unidirectional coupling or first unidirectional coupling 59. In this embodiment, therefore, the electric drive 5 and in particular the rotor 51 is operatively connected to the shaft 2, in said electric command zone 25, by means of the aforementioned electrical unidirectional coupling 59. Preferably, said electrical unidirectional coupling 59 is suitable to command the operational connection or disconnection between the rotor 51 and the shaft 2.

According to the present invention, the electric unidirectional coupling 59 comprises a rolling bearing, preferably with rollers. For example, the rolling bearing is of the roller or needle roller type, having rolling elements arranged between the driven ring and the driving ring. Preferably, the electric unidirectional coupling 59 is integrally connected to the rotor 51 of the electric motor 50.

The mechanical drive 10 comprised in the pump group 1 object of the present invention comprises a rotating member 11 commandable in rotation by mechanical movement devices comprised in the vehicle, comprising the motor shaft of the vehicle engine. In other words, the rotation speed of the mechanical drive 10 and in particular of its rotating member 11 is directly a function of the rotation speed of the engine of the vehicle to which it is connected.

Preferably, the rotating member 11 has its own center of rotation on the axis X-X.

According to a preferred embodiment, the rotating member 11 is a pulley operably connectable to the mechanical movement devices of the engine by a belt or a chain.

According to a variant embodiment, the rotating member 11 is a gear operatively connectable to the mechanical movement devices of the engine by a specific gear.

Preferably, said rotating member 11 is rotatably mounted movable on said shaft 2.

According to the present invention, moreover, the mechanical drive 10 comprises a rotary drum 12 which is operatively connected with the shaft 2 to command it in rotation. The shaft 2 is moved in rotation by transmitting to the rotary drum 12 the rotation of the rotating element 11.

Preferably, the shaft 2 extends in length along the axis X-X having a mechanical command end 21 on which the mechanical drive 10 operates. Preferably, the mechanical command end 21 is opposite the rotating end 23. Preferably, the electric command zone 25 is interposed between the mechanical command end 21 and the rotating end 23.

In particular, the rotary drum 12 is operatively connected to said mechanical command end 21.

In a preferred embodiment, the rotary drum 12 is integrally connected with the shaft 2.

According to a preferred embodiment, the rotary drum 12 comprises an annular crown 120 concentric with respect to the axis X-X. Moreover, this annular crown 120 also comprises an inner surface 121 which extends substantially parallel to the axis X-X.

According to a preferred embodiment, said inner surface 121 has a high friction coefficient.

According to the present invention, in fact, the mechanical drive 10 comprises a centrifugal clutch device 15 suitable to connect the rotating member 11 with the rotary drum 12 in such a way as to transmit the rotation of the first to the second.

Said centrifugal clutch device 15 comprises a central body 151 integrally attached to the rotating member 11 at the axis X-X.

Preferably, the central body 151 is fixed to the rotating member 11 by means of a plurality of screws 1519 screwable onto the rotating member 11 through the central body 151.

Moreover, the centrifugal clutch device 15 comprises a plurality of engagement elements 152 fixed in a movable manner on the central body 151, wherein each engagement element 152 is suitable to translate in a radial direction with respect to the axis X-X.

In particular, each engagement element 152 is suitable to be movable in a radial direction between a rest position, in which it is proximal to the central body 151, and an position engagement, in which it is distal from the central body 151 and engages by a radial friction action the annular crown 120, and in particular the inner surface 121 thereof.

This radial movement is a function of the rotation speed of the rotating member 11 and therefore of the central body 151 solidly connected thereto.

In particular, the engagement element 152 is in a rest position at low rotation speeds of the rotating member 11, vice versa, the engagement element 152 moves in an engagement position at high rotation speeds of the rotating member 11.

According to a preferred embodiment, moreover, the central body 151 comprises a plurality of housings 1510 suitable to accommodate the engagement elements 152 in the rest configuration.

Such housings 1510 are specially shaped in a complementary manner to the engagement elements 152. Preferably, such housings 1510 have a shape substantially comparable to a circular sector.

According to the present invention, furthermore, each engagement element 152 comprises a contact portion 1520 which extends along a circumferential arc and is specifically suitable to engage the annular crown 121 when it is positioned in the engaged position.

In other words, each engagement element 152 is such as to engage the annular crown 121 by a circumferential portion. That is to say, the centrifugal clutch device 15 engages the rotary drum 12 circumferentially, with a 360° homogeneous action.

According to a preferred embodiment, all the contact portions 1520 of the engagement elements 152 have a substantially circular extension.

In other words, each engagement element 152 has an angular extension equal to the consecutive one. In the embodiment shown, the centrifugal clutch device 15 comprises three engagement elements 152, each having an angular extension of substantially 120°.

In any case, embodiments are contemplated with two engagement elements 152 or with more than three engagement elements 152.

According to a preferred embodiment, each contact portion 1520 has variable thickness, comprising a high-thickness zone 1521 located at the center of the contact portion 1520.

In addition, according to a preferred embodiment, the contact portion 1520 has an axial width substantially equal to the width of the inner surface 121.

According to a preferred embodiment, the contact portion 1520 is made of a material with a high friction coefficient. For example, in a preferred embodiment, the contact portion 1520 is of a sintered metal powder.

According to a preferred embodiment, the central body 151 comprises a plurality of guide elements 1511 adapted to guide the radial movement of the engagement elements 152. Preferably, said guide elements 1511 extend in length, engageable by the engagement elements 152.

According to a preferred embodiment, the guide elements 1511 are pins which are threaded in special holes comprised in the engagement element 152.

According to an embodiment variant (not shown), instead, the guide elements 1511 are holes threaded by special radial pins engaged by the respective engagement elements 152.

Preferably, two guide elements 1511 are provided for each engagement element 152. Preferably, said guide elements 1511 are mutually spaced, extending parallel to one another.

Moreover, according to a further preferred embodiment of the present invention, the central body 151 comprises elastic retaining elements 1515 operatively connected to the respective engagement elements 152 suitable to carry out a retaining action opposing the radial movement of the engagement element 152.

According to a preferred embodiment, an elastic retaining element 1515 is provided for each engagement element 152.

According to a preferred embodiment, the elastic retaining element 1515 is a tension spring. For example, in a preferred embodiment, the tension spring 1515 is a helical spring.

Preferably, each elastic retaining element 1515 carries out a retaining action that makes the radial movement of the respective engagement element 152 progressive and makes its engagement with the annular crown 120 progressive.

According to a preferred embodiment, the elastic retaining elements 1515 allow the radial movement of the respective engagement element 152 if the rotation of the rotating member 11 exceeds a predetermined threshold value. Preferably, said threshold value refers to the rotation speed of the pump group.

By way of example, in the automotive sector, with an application of the pump group 1 object of the present invention on a medium-sized motor vehicle with a medium-size engine, the threshold value is between 3000 and 3800 rpm.

Preferably, primarily, the threshold value is directly a function of the physical characteristics of the elastic retaining element 1515. But, additionally, preferably, the threshold value is also directly a function of the physical characteristics of the engagement element 1515.

According to the object of the present invention, the command means described above are suitable to rotate the impeller 3 according to the operating conditions and the needs of the vehicle, either with the electric drive 5 or with the mechanical drive. 10.

Preferably, in fact, at low engine speeds or in a configuration in which the engine is switched off, the mechanical drive 6 has the centrifugal clutch device 15 in the rest configuration; in such situations, therefore, the impeller 3 is commandable in rotation by means of the electric drive 5 depending on the needs.

For example, when the vehicle is started, when the engine is still cold (so-called "warm-up" configuration), and therefore, as indicated by the manufacturer, when the driver of the vehicle drives the vehicle at low engine speeds, the electric drive 5 is left deactivated. In this situation, therefore, the impeller 3 remains stationary, the liquid does not circulate in the circuit and the engine proceeds faster towards heating.

Or again, in an opposite situation in which one is at the end of the use of the vehicle and the engine is very hot the electric drive 5 is activated so as to keep the impeller 3 rotating and the coolant fluid (this step is therefore the one called "post run"). In this way, although the mechanical drive 10 is completely inactive, since the vehicle engine is stationary, the impeller 3 rotates at a predetermined rotation speed resulting in a coolant fluid circle.

Further situations occur in the presence of high loads, for example when the vehicle drags a tow or faces an uphill road, typically going at low speed (so, with low engine revolutions); in such situations, the centrifugal clutch device 15 is in a rest configuration and therefore the cooling is totally managed by the electric drive 5.

On the other hand, at high engine revolutions (in which a greater cooling of the engine is therefore necessary), the mechanical drive 10 has the centrifugal clutch device 15 in the engagement configuration; in such situations, therefore, the impeller 3 is commandable in rotation, preferably by means of the mechanical drive 10.

According to the foregoing and as shown in the accompanying figures, it is noted that the centrifugal clutch device is substantially axially symmetrical. In this way, therefore, the centrifugal clutch device operates in the aforementioned manner, either by rotating clockwise or by rotating counter clockwise. In addition, therefore, the centrifugal clutch device is mountable on the rotating member in both directions.

Innovatively, the pump group object of the present invention meets the engine cooling requirements and overcomes the drawbacks mentioned above.

Advantageously, the pump group according to the present invention is very flexible, since it responds to the cooling needs of the vehicle according to the actual demand and not only depending on the engine speed or the availability of electrical power of the system. That is to say that, advantageously, the pump group is particularly suitable for managing in its entirety the quantity of coolant in the cooling system, for example managing the cooling of further components of the vehicle in addition to the engine, such as the turbo group, obviating the need to have specific electric pumps that move the preset amounts of coolant in these components, allowing further space in the engine compartment to be gained.

Advantageously, the pump group object of the present invention is suitable to fully exploit the advantages connected to the double drive.

Advantageously, the actuation of the mechanical drive is managed by the centrifugal clutch device which avoids sudden and "tearing" actuation. Advantageously, the engagement of the mechanical drive is progressive. Advantageously, the frictional action of the engagement elements on the rotary drum is progressive. Advantageously, the action of the elastic elements involves a progressive radial action.

Advantageously, the mechanical drive managed by the centrifugal clutch device is particularly silent. Advantageously, the pump group operates in a particularly silent manner.

Advantageously, the presence of the centrifugal clutch allows a simplified management of the mechanical drive and in general a simplified management of the shaft command and therefore of the impeller.

Advantageously, the centrifugal clutch device is suitable to perform a homogeneous engagement on the 360° of the annular crown. Advantageously, the centrifugal clutch device imparts a high torque on the rotary drum. Advantageously, the centrifugal clutch device is suitable to operate ensuring excellent operating stability.

Advantageously, the centrifugal clutch device does not have a predefined direction of rotation, operating either clockwise or counter clockwise.

Advantageously, the centrifugal clutch device is mountable on the rotating member in both directions.

Advantageously, the production and assembly operations of the centrifugal clutch device are extremely simplified.

Advantageously, the transition from the electric drive to the mechanical drive and vice-versa is mechanically managed by the synergic presence of the centrifugal clutch and the first unidirectional coupling. Therefore, advantageously, the electronic management of the pump group is very simple. In other words, advantageously, in the pump group of the present invention, it is not necessary to have an electrical synchronization of the activation of the two drives, as for example necessary in some dual drive pumps comprising an electromagnetic pulley in the mechanical drive: the electric drive alone must be managed electrically, only within rotation speeds lower than those guaranteed by the mechanical drive.

Moreover, advantageously, the pump group is particularly light and compact, that is in small size, being particularly suitable to be accommodated in the engine compartment of a motor vehicle.

Advantageously, the pump group is able to prevent the cooling action, although the engine is running, when, for example in "warm-up" conditions, it is advisable to heat the engine. In a further advantageous aspect, the pump group has the "fail-safe" feature; in fact, in the event of a failure of the electric drive, the pump group, due to the mechanical drive and the second unidirectional coupling, continues to ensure the movement of the impeller. According to a further advantageous aspect, the pump group is operative in "post-run" conditions, that is with the engine off.

Advantageously, the pump group is particularly advantageous also in the situations of starting the engine, and of "Start & Stop", which typically entail a heavy load on the components dedicated to the starting (for example on the starter engine) which undergo an accelerated wear; in fact, due to the presence of the centrifugal clutch, in such situations, the pump group does not contribute to generating unfavorable loads on said parts dedicated to starting.

Advantageously, the dual pump group is suitable to operate in the described operating situations in the most effective manner possible, solving the need to have an electromagnetically commandable pulley. The mechanical drive of the dual pump object of the present invention is therefore of a more compact size, lower weight and does not require electrical energy to operate.

It is clear that a man skilled in the art may make changes to the pump group described above in order to meet incidental needs, all falling within the scope of protection defined in the following claims. Moreover, each variant described as belonging to a possible embodiment may be implemented independently of the other variants described.

What is claimed is:

1. A pump group for a cooling system of an engine of a vehicle, the pump group extending along an axis (X-X) and comprising:
   i) a shaft extending along the axis (X-X);
   ii) an impeller rotatable around the axis (X-X) and operatively connected to the shaft;
   iii) an electric drive comprising an electric motor operatively connected to the shaft for commanding the shaft in rotation, wherein the electric motor comprises a rotor and a stator; and
   iv) a mechanical drive comprising:
   a rotating member having a center of rotation on the axis (X-X), which is commandable in rotation by mechanical movement devices comprised in the vehicle, comprising the motor shaft of the engine of the vehicle;
   a rotary drum operatively connected to the shaft for commanding the shaft in rotation, comprising an annular crown concentric with respect to the axis (X-X) and comprising an inner surface extending parallel to the axis (X-X); and
   a centrifugal clutch device comprising:
   m) a central body integrally attached to the rotating member extending along the axis (X-X); and
   n) a plurality of engagement elements fixed in a movable manner on the central body, each engagement element of said plurality of engagement elements comprising a contact portion extending along a circumferential arc, wherein each engagement element of said plurality of engagement elements is suitable to move in a radial direction with respect to the axis (X-X) between a rest position, wherein it is proximal to the central body and is separated from the annular crown, and an engagement position, wherein it is spaced apart from the central body and engages, by a radial friction action, the inner surface of the annular crown;
   wherein the electric drive comprises an electrical unidirectional coupling, wherein the rotor is operatively connected to the shaft by the electrical unidirectional coupling, which is configured to command the operational connection or the disconnection between the rotor and the shaft.

2. The pump group of claim 1, wherein all contact portions of the plurality of engagement elements have a substantially circular extension.

3. The pump group of claim 2, wherein each contact portion has variable thickness, comprising a high-thickness zone located at a center of the contact portion.

4. The pump group of claim 2, wherein each contact portion has an axial width substantially equal to the width of the inner surface.

5. The pump group of claim 1, wherein the central body comprises a plurality of housings suitable to accommodate the plurality of engagement elements in the rest position.

6. The pump group of claim 1, wherein the central body comprises a plurality of longitudinally extending guide elements engageable by the plurality of engagement elements suitable to drive radial movement of the plurality of engagement elements.

7. The pump group of claim 6, wherein the longitudinally extending guide elements are pins threaded in dedicated holes comprised in the plurality of engagement elements, or the longitudinally extending guide elements are holes threaded by dedicated radial pins comprised in the plurality of engagement elements.

8. The pump group of claim 6, wherein for each engagement element, there are provided two longitudinally extending guide elements that are angularly spaced.

9. The pump group of claim 1, wherein the central body comprises a plurality of elastic retaining elements operatively connected to respective engagement elements suitable to carry out a retaining action opposing the radial movement of the engagement elements.

10. The pump group of claim 9, wherein each elastic retaining element of the plurality of elastic retaining elements carries out a retaining action that makes the radial movement of the respective engagement element progressive and makes its engagement with the annular crown progressive.

11. The pump group of claim 9, wherein each elastic retaining element of the plurality of elastic retaining elements allows the radial movement of the respective engaging element if rotation of the rotating member exceeds a predefined threshold value ranging from 3000 to 3800 rpm.

12. The pump group of claim 1, wherein the rotating member is a gear mechanism operatively connected by a gear mechanism comprised in said mechanical movement devices of the engine.

13. The pump group of claim 1, wherein the shaft extends along the axis (X-X) and has a mechanical command end on which the mechanical drive operates, wherein the rotary drum is operatively connected to the mechanical command end.

14. The pump group of claim 13, wherein the rotary drum is integral with the shaft.

15. The pump group of claim 13, wherein the shaft comprises an electric command zone operatively connected to the electric motor, wherein the electric command zone is located between the mechanical command end and a rotating end on which the impeller is integrally connected.

* * * * *